P. F. DUSHA, A. FEYK & J. KOMANCSEK.
BUTTON MAKING MACHINE.
APPLICATION FILED DEC. 28, 1911.

1,077,336.

Patented Nov. 4, 1913.
5 SHEETS—SHEET 2.

Fig. 2.

Witnesses

Inventors
P. F. Dusha,
A. Feyk and
J. Komancsek.

By
Attorney

UNITED STATES PATENT OFFICE.

PAUL F. DUSHA, ANTON FEYK, AND JOSEPH KOMANCSEK, OF NEW YORK, N. Y., ASSIGNORS TO HOLUB-DUSHA COMPANY, OF NEW YORK, N. Y.

BUTTON-MAKING MACHINE.

1,077,336.	Specification of Letters Patent.	Patented Nov. 4, 1913.

Application filed December 28, 1911. Serial No. 668,253.

*To all whom it may concern:*

Be it known that we, PAUL F. DUSHA, ANTON FEYK, and JOSEPH KOMANCSEK, citizens of the United States, residing at New York, in the county of New York and State of New York, have invented certain new and useful Improvements in Button-Making Machines, of which the following is a specification.

This invention comprehends certain new and useful improvements in machines for making buttons, the present invention relating particularly to improvements in a machine of the character disclosed by our copending application for Letters Patent of the United States, Serial No. 668,252, filed the 28th day of December, 1911, it being understood that the machine as a commercial article includes not only the present invention and the invention disclosed in the application just referred to, but automatic blank feeding devices and an adjustable drill mechanism for forming stitch receiving openings for buttons of the fish eye type, forming the subjects-matter of other copending applications.

The present invention, in addition to partaking of the advantages of and the results sought for in and attained by the machine as disclosed in the application above specifically mentioned, has for its primary object a button forming machine which will be practically automatic in all of its operations and which is especially designed, in its present embodiment, for forming buttons of the type known as "self shank" buttons, and the invention also aims to produce a machine of this character for the purpose specified which will be so constructed and the parts so arranged that the blanks will be received in the machine from the feeding devices and be carried around in the machine and formed with shanks and subsequently milled out and drilled in their shanks, so as to maintain a practically continuous operation, the completed buttons being finally discharged from the machine, preferably at about the same point that the blanks are fed into the machine.

The invention also has for its object a machine of this character for forming "self shank" buttons, the machine embodying milling tools and a shank drilling tool that act upon the button blanks successively, said tools being so mounted that they may be continuously rotated and so arranged that they will be carried around for a predetermined period with and at the same speed as the chuck carrier for the blanks, and will at predetermined intervals be returned so as to act upon other blanks in the continuously moving series.

The invention also has for one of its main objects, a machine of this character embodying a shank drilling tool and an improved arrangement and construction of milling tools and actuating mechanism therefor, whereby the blanks, as they are carried along in the chuck carrier will have their shanks first partially bored out on one side and then turned and partially bored out on the opposite side, and finally presented to the drilling tool which will be accurately positioned in one of the milled out portions of the shank so as to effectively drill therethrough, all liability of the drilling tool slipping off of the shank being obviated, and the machine resulting in the further advantage of drilling the shank practically in three successive operations so as to reduce to a minimum the possibility of the shank being split and the button thereby rendered defective and of no use. And the invention also aims to generally improve this class of machines and to render them more useful to the trade and generally more desirable.

With these and other objects in view, as will more fully appear as the description proceeds, the invention consists in certain constructions, arrangements and combinations of the parts that we shall hereinafter fully describe and claim.

For a full understanding of the invention, reference is to be had to the following description and accompanying drawings, in which.

Corresponding and like parts are referred to in the following description and indicated in all the views of the drawing by the same reference characters.

The power to operate the machine may be supplied from any suitable source and is transmitted to the machine by a main shaft 1 on which are fast and loose pulleys 2, said shaft being journaled in a post or standard 3 of a supporting framework which may be of any desired construction or type, just so long as it can support and house the actuating elements of the apparatus, said framework including in the present instance a foundation 4 and a cylindrical base 5 connected to or formed integral with the foundation. The inner end of the driving or main shaft 1 preferably has a clutch connection 6 with a shaft 7 that carries a spur gear wheel 8, the latter meshing with a corresponding wheel 9 movable with and driving a stepped pulley 10. The pulley 10 is connected by a driving belt 11 to a corresponding but oppositely positioned pulley 12, and said last named pulley is secured to a countershaft 13 arranged parallel to the main driving shaft 1 and extending into the base 5 where it is journaled in a housing 14 and provided with a worm 15. The worm 15 meshes with a worm gear 16 which is secured to a vertically disposed spindle 17 preferably mounted on a thrust bearing 18 in the housing 14. The upper end of the spindle 17 is journaled in a casting 19, of which the housing 14 preferably forms a part, said casting being supported on and secured to the inwardly extending annular flange 20 formed on the upper end of the base 5. The upper end of the spindle 17 has secured to it a horizontally disposed spur pinion 21 which meshes with the interior teeth 22 of a ring 23 which is bolted or otherwise secured to a revoluble drum 24 which carries the chucks and their correlated devices, as will be hereinafter more fully described.

The drum 24 is mounted to rotate about a central vertical axis and is formed with a vertically disposed, centrally positioned dust discharging passage 25 which leads into a dust collector or trap 26, provided with a movable closure 27 and formed with a branch 28 to which there may be secured any desired form of suction device (not shown), a screen 29 being secured in one end of the branch 28 so as to prevent shell particles and dust from entering into the branch, compelling them to drop into the trap 26 from which they may be easily removed. The upper end of the trap 26 is formed with an outwardly extending flange 30 secured to the lower end of the casting 19, the hollow hub of the drum 24, which forms the discharge passage 25, having a scarfed joint with the upper edge of the trap. The passage 25 of the hub 24 leads downwardly from an upwardly projecting flared chamber 31 formed in the drum, said chamber in turn communicating at its upper end with a series of radially disposed and outwardly and upwardly projecting suction mouths 32 that are formed in the drum and that open at the upper surface of a circular table 33 which forms the upper end of the drum, the entrance ends of said mouths 32 lying contiguous to the respective chucks 34 which are designed to receive and hold the button blanks while the same are being acted upon. In the present embodiment of the machine, there are twelve chucks arranged in a circular series around the margin of the table 33 at regular intervals, as best indicated in Fig. 2 although it is to be understood that our invention is not limited to this or any number of chucks.

The chucks 34 are carried by vertically disposed spindles 35 that are mounted to rotate about their longitudinal axes, said spindles being supported at their lower ends in vertically movable step bearings 36 which are provided at their lower ends with rollers 37 mounted to travel on a cam track 38, said cam track being supported between the flange of the casting 19 and the flange which is formed at the lower end of the cylindrical upper casing section 5ᵃ, and being so formed that the spindles with the chucks in them will be moved upwardly to present the blanks in the spindles to the devices that work upon the blanks, as will be hereinafter more specifically described.

Figure 1:
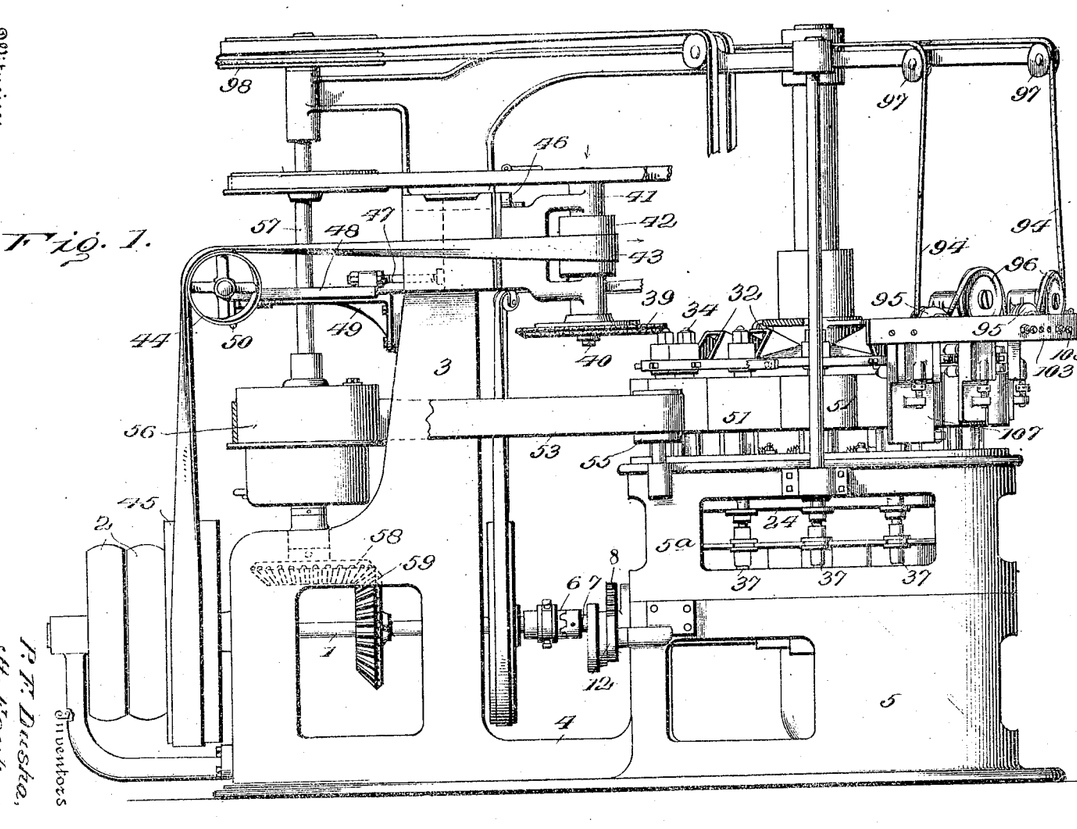
Figure 1 is a side elevation of our improved button forming machine arranged to form buttons of the "self shank" type, parts being shown in section.
Figures 6, 7:
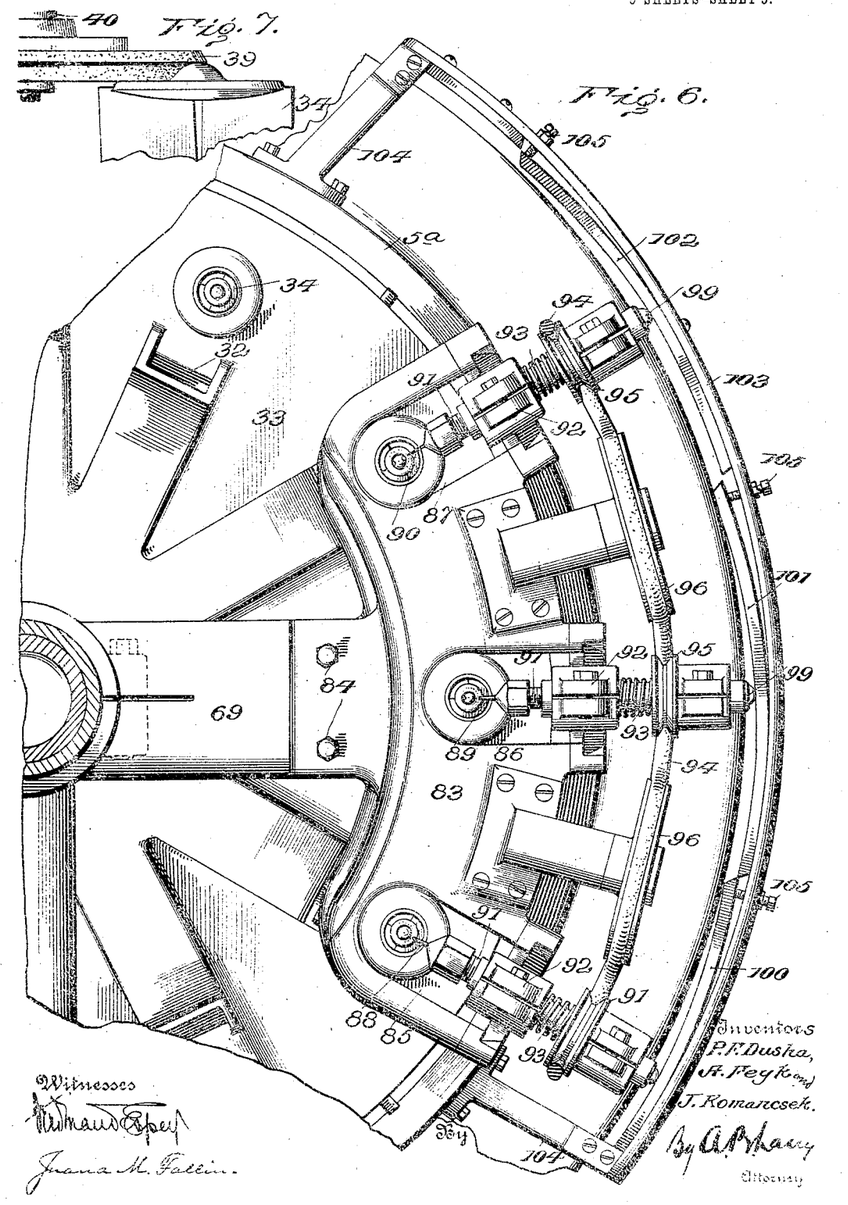
Fig. 6 is an enlarged, fragmentary top plan view of the machine.
Fig. 7 is a sectional view of one of the chucks, illustrating the grinding disk in engagement with a blank to form a shank thereon.

By reference to Figs. 1 and 7 it will be understood that the shanks are formed on the blanks by grinding, in the present embodiment of the invention, this operation being performed in the present instance by means of a grinding disk 39 secured to a vertically disposed shaft 40 mounted in a bracket 41 and carrying a pulley 42 over which the driving belt 43 passes. This belt also passes over idlers 44 and around a pulley 45 which is secured to the main driving shaft 1. The bracket 41 is mounted for vertical movement on a guideway 46 so that the position of the disk 39 may be adjusted vertically, as required, and the guide-way 46 is in turn adjustable in the standard or post 3, being secured at its rear side to a rod 47 which is in turn fastened to a slide 48 mounted on a bracket 49 and operated by a hand wheel 50, the horizontal adjustment of the disk 39 being thereby attainable. The chuck spindles 35 are rotated as they are raised into operative relation to the grinding disk 39 as the spindles are carried around by the table 33. To effect the rotation of the spindles, each of them carries a pulley 51 designed in a portion of the traverse of the table 33 to be engaged by a circumferentially extending stretch 52 of a driving belt 53. This belt passes around idlers 54 and 55, and also around a driving pulley 56 which is carried by a vertically disposed shaft 57 journaled in the spindle 3. The shaft 57 is driven by means of beveled pinions 58 and 59 which mesh with each other and which are carried by said shaft and the main driving shaft 1, respectively.

Figure 2:
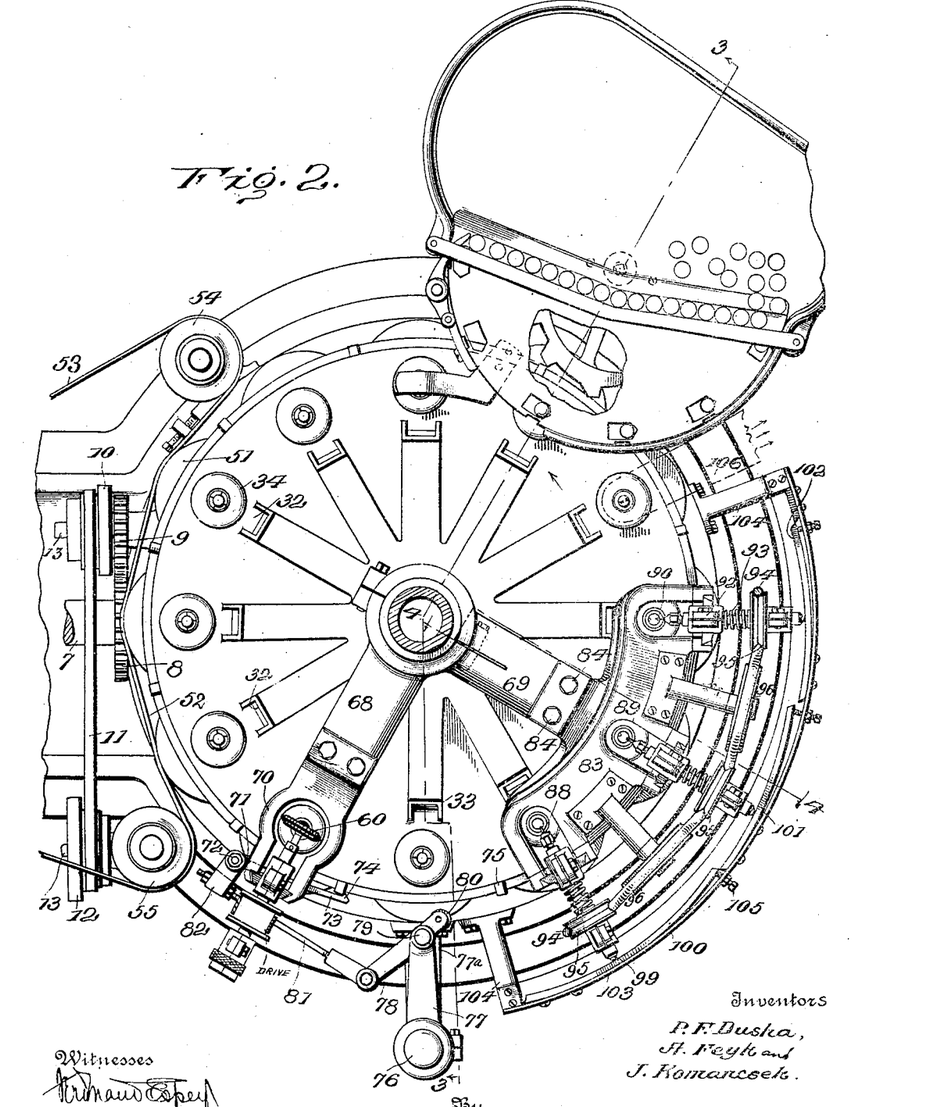
Fig. 2 is a top plan view of the machine, parts being omitted and other parts broken away and in section.

By special reference to Fig. 2 it will be understood that the chuck spindles 35 will be continuously rotated from the time their pulleys 51 engage the stretch 52 until they pass out of engagement with said stretch, in the continuous revolution of the chuck carrier of which the table 33 forms a part. It is to be understood that so far as the present invention is concerned, the rotation of the chuck spindles for this length of time or portion of traverse of the chuck carrier is not necessary, but is used because the present invention relates to the main machine disclosed in our copending application hereinbefore specifically mentioned, wherein the button blanks are faced, formed with a fish eye, if desired, and subsequently drilled, and the same machine actuating members of that machine are utilized for the present machine, in order that the commercial machine may be capable of a wide range of usefulness. It will be noted, then, that at some time after the grinding operation has been completed and before the shanks are milled and drilled, it is necessary to bring the rotating spindles to a standstill, so far as regards any rotation about their own axes, this point being in the present embodiment of the invention as applied to the invention disclosed in the specification mentioned hereinbefore, that point where the spindle pulleys 51 leave the idler 55. Immediately after leaving this point, the chucks pass under the fish eye tool 60 which, of course, is not used in making buttons of this character, but which is shown in the present case because it also forms a preferably permanent although detachable member of the machine as disclosed in our hereinbefore mentioned copending application.

Figure 5:
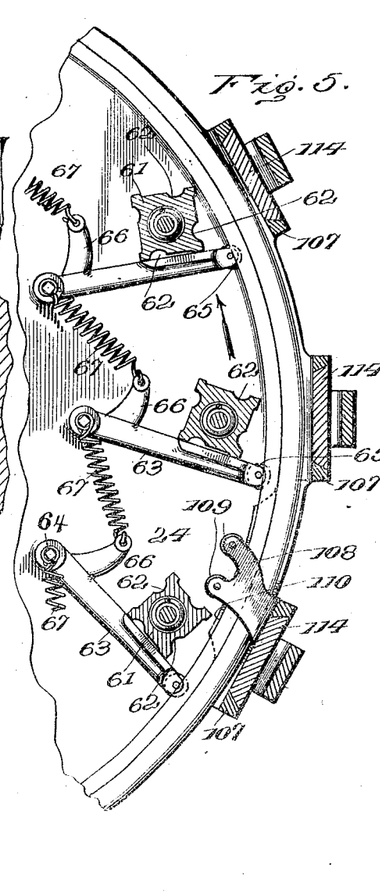
Fig. 5 is a fragmentary top plan view of the revoluble drum or chuck carrier, parts being shown in section.

In order to stop the rotation of the chuck spindles 51 before they reach the milling and drilling tools, each spindle is provided, underneath its pulley 51, with a keeper 61, said keepers being in the form of substantially rectangular blocks, as best illustrated in Fig. 5 and formed in each of their faces with longitudinal grooves or recesses 62. Secured to the drum 24 are latch arms 63, one for each keeper 61, said latch arms being pivotally connected to the drum 24 at one end, as at 64, and extending outwardly from their pivoted ends and provided at their other ends with rollers 65, that are held by cams out of engagement with the keepers while the spindles are rotating. The latch arms 63 are formed with lateral extensions 66 connected to contractile springs 67 having a tendency to hold the latch arms in engagement with the keepers. Thus, the keepers and the spindles are held relatively stationary as against rotary movement until the shank is first milled on one side, the latches are then released one at a time and the spindles partially rotated, and the latches reengaged while the shanks are milled from the opposite side, and the latches are allowed to remain in engagement with the keepers while the thread-receiving openings are drilled entirely through the shanks. We shall now describe the elements for performing these movements and operations.

Figure 3:
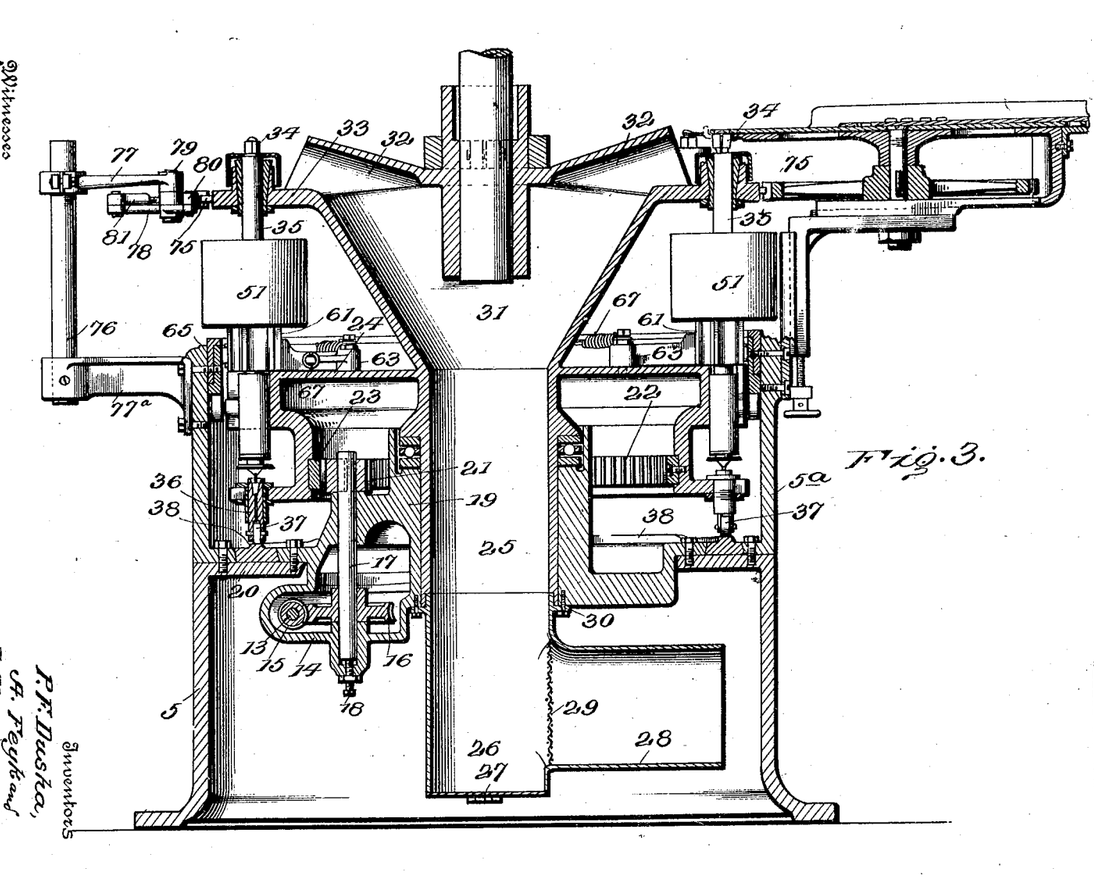
Fig. 3 is a vertical transverse sectional view, the section being taken substantially on the line 3—3 of Fig. 2.
Figure 4:
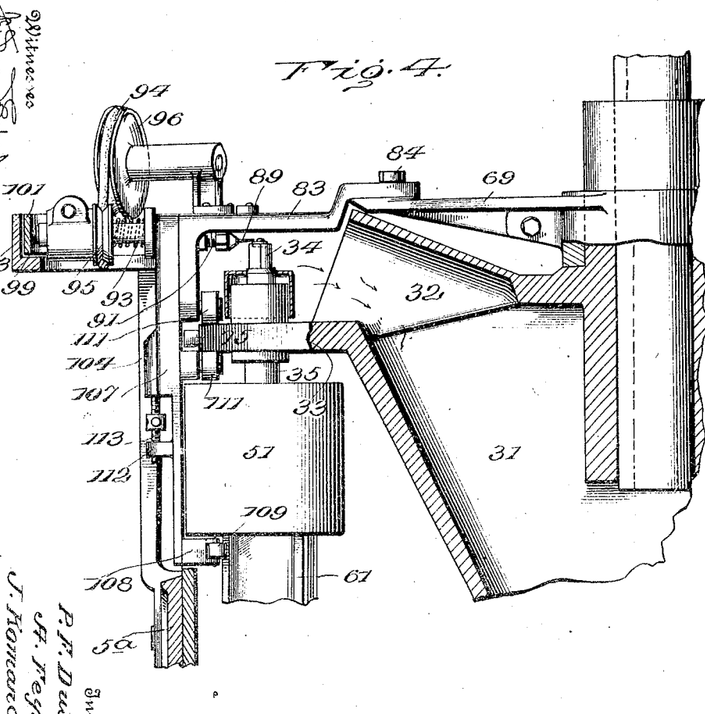
Fig. 4 is a section on the line 4—4 of Fig. 2, looking in the direction of the arrows.

Movable freely about the same axis as the revoluble drum 24 and its table 33 is a casting embodying right angularly disposed arms 68 and 69. Detachably connected to the arm 68 by stud bolts, or the like, is a bracket 70 which not only carries the fish eye tool 60 for the machine when arranged as disclosed in the copending application hereinbefore specified, but also serves as one of the operative elements of the machine when arranged as disclosed herein. The bracket 70 which practically forms a continuation of the arm 68 and which may therefore be referred to as such continuation of the arm 68, is provided at one side with an ear 71 in which a spindle 72 is held. A latch 73 is pivotally mounted at one end on the spindle 72 and is provided at its free end with a beveled hook 74 designed to be repeatedly engaged by pins 75 which project radially in an outward direction from the edge of the table 33, said latch being spring pressed inwardly toward the table. A post 76 projects upwardly from a supporting bracket 77ª (see Fig. 3) the upper end of the post being provided with an inwardly projecting supporting arm 77 on which a lever 78 is fulcrumed intermediate of its ends, as indicated at 79. The inwardly projecting arm of said lever carries a roller 80, and the outwardly projecting and relatively long arm of said lever is pivotally connected to a link rod 81 which is adjustably connected to a bar 82 pivoted on the spindle 72 but movable independently of the fulcrum 73. It will thus be understood that, in the revolution of the table 33 with its chucks, when one of the pins 75 engages the hook 74 of the latch 73, the arms 68 and 69 will be moved with the table in the same direction and at the same speed, and it is during this movement that the milling and shank drilling operations are performed. At the conclusions of these operations, it being understood that one blank is being milled from one side and another blank from the opposite side, and another blank having its shank completely drilled through, all at the same time, the hooked end 74 of the latch 73 will engage the roller 80 of the lever 78 which is swung inwardly to meet the latch owing to the connections just described, and the roller, engaging the beveled extremity of the latch, will disengage the latter from the pin 75 while immediately thereafter the pin will engage the roller and swing the arms 68 and 69 back again to their initial positions, and at a much quicker speed than their forward movements, owing to the continued movement of the lever 78.

A bracket 83 is detachably connected to the arm 69 by stud bolts 84 or similar fastening devices, as indicated in Figs. 2 and 6, said bracket 83 being formed with three recesses, designated 85, 86 and 87, where, respectively, the milling tools 88 and 89 and the drilling tool 90 are located. These tools are carried by threaded shafts 91 and project radially inward in a horizontal plane, said shafts being mounted in bearings 92 so that the tools may be adjusted as required. Each of the shafts 91 is encircled by a spring 93 which tends to move the shaft outwardly and back it away from the work, and all of said shafts are connected for simultaneous rotation by means of a driving belt 94 which passes around pulleys 95 secured to respective shafts 91 and around intermediate idlers 96. The belt 94 also passes around idlers 97 carried by the framework of the machine and around a driving pulley 98 secured to the upper end of the shaft 57 before mentioned.

Each shaft 91 is provided at its rear or outer end with a ball bearing 99, the same being engageable with cam strips 100, 101 and 102, all of which are secured in any desired way at one end to a segment 103 supported by bracket arms 104 from the casing section 5ª. The cams are adjusted by means of set screws 105, as clearly indicated in Fig. 6, whereby the amount of inward movement of the tools 88, 89 and 90, may be varied, as required.

In the simultaneous and coincident movement of the arms 68 and 69, and the table 33, the chuck carrying spindles 35 will be raised by means of the track 38 into operative relation with the tools 88, 89 and 90, said tools will be continuously rotated about their own axes, the tool 88 will be moved inwardly slightly by the cam 100 to mill out a portion of the shank of one blank, the tool 89 will be simultaneously operating upon the opposite side of the shank of a blank which has been previously acted upon by the tool 88, and the tool or drill 90 will, by means of the cam 102 and intermediate elements, drill through the shank which is operated upon by the tools 88 and 91, and as soon as these three operations have been completed, the arms 68 and 69 will be swung back again in the reverse direction, the tools 88, 89 and 90, being retracted, and the chuck spindles being preferably lowered. Thus, the blanks will be treated one after the other, in their turn, and the completed blank or button will pass on, in the continued revolution of the table 33, to the discharge point where, for instance, it may be sucked out of the opened chuck by means of a suction tube, as indicated at 106 in Fig. 2.

It is, of course, to be understood that the chucks must be given a one-half revolution about their axes of rotation between the time the first milled out portion of the shank is formed and the time the next milled out portion is to be formed. To accomplish this, we have provided the bracket 83 with downwardly projecting portions 107, one of which is formed with the inwardly turned lower end 108 carrying two spaced rollers 109, designed for engagement, successively, with the keepers 61, in the recesses 62 thereof. It will thus be understood that after the tool 88 has acted upon a blank, the arm 69 is swung rearwardly relative to the direction of rotation of the table 33 a distance equal to the space between two blanks or chucks, and that in this movement the adjoining latch arm 63 will be disengaged from its corresponding keeper 61 by a cam 110, while the two rollers 109 will successively engage the recesses 62 in two adjoining faces of the keeper and impart a half-turn to the keeper, whereupon the latch will ride off of the cam 110 and again engage the keeper so as to hold the chuck stationary in reversed position, as regards the blank, so that the succeeding inward movement of the tool 89 will mill out the opposite side of the shank, as the bracket 83 is again carried forward with the table 33 for a short distance. The next reverse movement of the bracket 83 will carry the blank, here used as an example, and the drilling tool 90, in operative relations with each other, whereupon the cam 102 operating upon the shaft 91 of the drilling tool, will force the latter inwardly to pierce the shank and complete the formation of the thread-receiving opening.

Each of the arms 107 carries upper and lower guide rollers 111 designed to engage the upper and lower faces of the table 33 at the rim thereof, for guiding purposes, and each rim is preferably provided with an ear 112 in which an adjusting screw 113 works, said screw bearing upon a slide 70 which directly carries the rotating part above it, whereby the vertical positions of the shafts 91 may be varied so as to bring the tools which they carry into the proper plane for co-action with the blanks.

From the foregoing description in connection with the accompanying drawings, the operation of our improved button forming machine will be apparent.

In the practical use of the device, the button blanks, in the chucks, will first be formed, in the continued revolution of the chuck carrier, with shanks, the chucks will then be successively brought to a standstill as they are carried farther around, and each blank will have its shank milled out on one side, and will then be reversed, and have its shank milled out on the other side, and subsequently will have its shank entirely pierced, the completed button being then discharged from the machine.

The present embodiment of the invention, so far as the milling and drilling operations are concerned, is of such character as to work on three blanks at once, the operation being a practically continuous one so far as the formation of the completed articles is concerned, the milling and drilling tools moving with the chuck carrier as they operate upon the blanks, and then moving back one step to catch up with the next blank in the series, so as to repeat their operations. By first milling the shanks as hereinbefore described, the drill 90 will be properly centered as regards the shank, and all liability of the drill slipping from the shank or the blank slipping from the drill avoided, while at the same time the milling out of the shanks on opposite sides manifestly facilitates the subsequent drilling operation and tends to a considerable degree to avoid the liability of breaking the buttons.

While the accompanying drawings disclose what we believe to be the preferred embodiment of our invention as regards the machine arranged for forming buttons of the "self shank" type, it is to be understood that the invention is not limited thereto, but that various changes may be made in the construction, arrangement and proportions of the parts within the scope of the claims.

Having thus described our invention, what is claimed is:

1. A button forming machine including a movable chuck carrier, a button chuck carried thereby, a shank grinding wheel disposed in parallel relation to the plane of movement of the carrier, means for rotating the chuck and grinding wheel, and means for subsequently drilling perforations through the shank so formed parallel to the face of the button.

2. A button forming machine including a movable chuck carrier, a button chuck carried thereby, means for forming a shank on the blank carried by the chuck, and a drill operated subsequently to the shank forming mechanism, said drill operating in a plane parallel to the face of the button.

3. A button forming machine including a movable chuck carrier, a chuck carried thereby, means for forming a shank on a blank carried by the chuck during the movement of the carrier, means for milling out the opposite portions of a shank of said blank during the movement of the carrier, said means operating in a plane parallel to the face of the button, and means for subsequently drilling said shank through the milled out portions thereof and parallel to the face of the button.

4. A button forming machine, including a movable chuck carrier, chucks carried thereby, and means for automatically milling out one side of a shank of a blank in one chuck, for simultaneously milling out the opposite side from the shank of a blank in another chuck, said milling means operating parallel to the face of the button and transversely of the shank, and means for simultaneously drilling the shank of a blank in another chuck during the movement of the carrier, said drilling means operating parallel to the face of the button.

5. A button forming machine, including a movable carrier, a plurality of chucks carried thereby, milling tools and a drilling tool movable with the carrier and operating in a plane parallel to the face of the button, and means for automatically effecting the engagement of one milling tool with one side of a shank of a blank carried in a chuck, for subsequently effecting the engagement of another milling tool with the opposite side of the shank, and for then effecting the engagement of the drilling tool with said shank.

6. A button forming machine including a movable chuck carrier, chucks carried thereby, milling tools and a drilling tool movable with the carrier for a predetermined distance and operating in a plane at right angles to the chuck whereby to mill and drill the shanks of blanks carried by the chucks, and means for automatically effecting a reverse movement of said tools relative to the carrier so as to perform corresponding work upon the shanks of succeeding blanks in the chucks during the continued movement of the carrier.

7. A button forming machine, including a movable chuck carrier, a chuck carried thereby, a drilling tool movable with the carrier and operating in a plane parallel to the plane of the face of a button whereby to drill through the shank of a blank mounted in the chuck, and means for automatically rotating the drilling tool during its movement with the chuck carrier.

8. A button forming machine, including a chuck carrier, chucks carried thereby, milling and drilling tools movable with the carrier and operating in a plane parallel to the plane of the face of a button whereby to work on the shanks of blanks mounted in the chucks, and means for simultaneously rotating the milling and drilling tools during the movement of the carrier.

9. A button forming machine, including a movable chuck carrier, milling tools movable with the carrier and operating in a plane parallel to the face of a button whereby to work upon the shanks of blanks mounted in the chucks during the movement of the carrier, means for shifting the tools from one blank to the next, and means for rotating the chucks and the blanks in a plane parallel to the plane of movement of the carrier whereby to reverse the chucks and blanks relative to said tools.

10. A button forming machine, including a movable chuck carrier, milling tools movable with the carrier and operating in a plane parallel to the face of a button whereby to work upon the shanks of blanks mounted in the chucks during the movement of the carrier, means for shifting the tools from one blank to the next, and means for rotating the chucks and blanks in a plane parallel to the plane of movement of the carrier whereby to reverse the position of the chucks and the blanks.

11. A button forming machine, including a movable chuck carrier, chucks carried thereby, milling tools and a drilling tool movable with the carrier and operating in a plane parallel to the face of a button whereby to work on the shanks of blanks in the chucks, means for shifting the movement of the tools to work on succeeding blanks, means for rotating the chucks through a half circle after they have been acted upon by each tool whereby to reverse the blanks from one milling tool to the other, and means for holding the chucks stationary during the milling and drilling operation.

12. A button forming machine, including a revoluble chuck carrier, chucks carried thereby, an oscillating arm, a bracket secured thereto, milling tools and a drilling tool extending transversely to the axes of the chucks on said carrier carried by said bracket, means for rotating said tools, means for temporarily connecting the chuck carrier with said bracket to effect the simultaneous movement of the two for a predetermined distance, and means for automatically disconnecting the bracket from the carrier and for returning the bracket to its initial position.

13. A button forming machine, including a revoluble chuck carrier, chucks carried thereby, an oscillating arm, a bracket secured to said arm, milling tools and a drilling tool carried by said bracket, the chuck carrier being provided with outstanding pins, a latch movable with said arm and engageable by said pins, and means for automatically disconnecting the latch from the pins and for moving the arm in a direction reverse to the movement of the chuck carrier.

14. A button forming machine, including a revoluble chuck carrier, chucks carried thereby, oscillating arms, a bracket connected to one of said arms, a shank working tool carried by said bracket and extending transversely to the axes of the chucks on said carrier, means for operating said tool, a latch carried by the other arm, pins projecting from the chuck carrier and engageable with said latch, and means for automatically disengaging the latch from the pins and for moving the arms back to initial position.

15. A button forming machine, including a revoluble chuck carrier, chucks carried thereby, an oscillating arm, a bracket carried thereby, a drilling tool carried by the bracket and extending transversely to the axes of the chucks on said carrier, means for operating the same, means for shifting the drilling tool alternately inward and outward transversely to the line of movement of the carrier, and means for automatically moving the bracket with the chuck carrier for a predetermined distance and for automatically releasing the same and returning the bracket to its initial position.

16. A button forming machine, including a revoluble chuck carrier, chucks carried thereby, a drilling tool operating in a plane parallel to the chuck carrier and transverse to the axes of the chucks and being movable for a predetermined distance with the chuck carrier, a longitudinally movable shaft carrying said tool extending transversely of the path of movement of the carrier, and a relatively stationary cam adapted to engage said shaft to move the same longitudinally, for the purpose specified.

17. A button forming machine including a revoluble chuck carrier, a chuck carried thereby, a shank working tool operating at right angles to the axes of the chucks, a shaft carrying said tool, said shaft being longitudinally movable transversely to the direction of movement of the carrier and being movable with the chuck carrier for a predetermined distance, and a cam engageable with said shaft and arranged to move the tool into engagement with the shank mounted in the chuck.

18. A button forming machine, including a revoluble chuck carrier, chucks carried thereby, an oscillating arm, shafts carried by said arm and longitudinally movable transverse to the path of movement of the carrier, means for moving said arm for a predetermined distance with the chuck carrier, means for returning said arm to its initial position, shank working tools carried by said shafts, and means for automatically moving said shafts longitudinally during the movement of the arm with the carrier.

19. A button forming machine including a revoluble chuck carrier, a plurality of rotatable button chucks carried thereby, a plurality of button working tools mounted in spaced relation to each other exterior to the circumference of the carrier and extending transversely to the path of movement of the same and movable radially inward toward or from the center of movement of the carrier, means for holding the chucks from rotation while the tool is operating on the buttons carried thereby, means for causing a partial rotation of each chuck after the first tool has operated, and means for holding each chuck from rotation during the operation of the subsequent tool.

20. A button forming machine including a rotatable carrier, a rotatable button chuck carried thereby, a plurality of button working tools disposed in spaced relation and in a series parallel to the line of movement of the chuck, said tools being movable radially to the axial center of the carrier into and out of engagement with a button carried by the chuck, means for holding said chucks from rotation while the buttons are being operated upon by the tools, and means for giving a partial rotation to the chucks after each tool has operated.

21. A button forming machine including a revoluble carrier, a plurality of rotatable button chucks carried thereby, each provided with a many sided member, a plurality of spring actuated latches carried upon the carrier and engaging said many sided portion of the chuck to prevent the rotation of the chuck, a member surrounding the carrier and having cams adapted to engage said latches to release the same, means carried by said member and alternating with the latches for rotating said chucks, and button working tools carried by said member and projecting transversely to the path of movement of the buttons, and means for moving said tools into and out of operative engagement with the buttons.

22. A button forming machine including a revoluble carrier, a plurality of rotatable button chucks carried thereby, each chuck having a many sided head, a plurality of spring actuated latches, one for each chuck engaging said heads to hold the chucks from rotation, an annular member surrounding the carrier and having cams spaced from each other and disposed in the path of movement of said latches to withdraw the latches from engagement with the heads and permit the rotation of the chucks, a tool carrying arm, tools mounted thereon and extending transversely to the direction of movement of the carrier, and means carried by said arm and disposed between said tools adapted to engage the chucks and cause a partial rotation of the same after each button has been operated upon by one of said tools.

23. A button forming machine including a revoluble carrier, a plurality of rotatable button chucks mounted thereon, each chuck having a square head, a purality of latches pivotally mounted upon the rotatable carrier and adapted each to engage a square head to hold the chucks from rotation, a fixed member surrounding the carrier and having cams thereon adapted to engage the extremities of the latches and release the same from engagement with the chucks at predetermined intervals to permit the rotation of the chucks, radial arms carrying brackets disposed around a portion of the periphery of the carrier, button working tools carried upon said brackets, spaced from each other the same distance as the chucks are spaced from each other, means carried by said brackets and disposed behind each tool for engaging the square heads of the chucks and causing a rotation of the same when released by the latches, transversely extending tools mounted upon said brackets, means for moving said tools inward and outward, and means for rotating said tools.

24. A button forming machine including a revoluble carrier, a plurality of rotatable button chucks carried thereby, an arm radially mounted upon the pivotal center of the carrier and having brackets projecting beyond the carrier, a plurality of tool carrying shafts mounted upon said brackets, said shafts extending radially toward the center of the carrier, means for locking said arm in engagement with the carrier for movement through a predetermined distance, means for releasing said arm from the carrier, means for dragging said arm to its original position, pulleys carried by the shafts, common driving means for all of said pulleys, resilient means acting to urge the shafts outward, a fixed member disposed concentric to the path of movement of the carrier and spaced from the periphery thereof, and cams mounted on the fixed member and engaging the shafts to force them inward into and out of engagement with the button carried by said chucks.

In testimony wherof we affix our signatures in presence of two witnesses.

PAUL F. DUSHA. [L. S.]
ANTON FEYK. [L. S.]
JOSEPH KOMANCSEK. [L. S.]

Witnesses:
JOSEPH FRANKFURTHER,
AUGUSTUS PHILIPPSON.